United States Patent
Kemmann et al.

(10) Patent No.: US 6,236,121 B1
(45) Date of Patent: May 22, 2001

(54) DEVICE WITH A LOCK CYLINDER AND A SWITCHING DEVICE FOR VARIOUS ELECTRICAL FUNCTIONS, ESPECIALLY AN IGNITION STARTER SWITCH FOR MOTOR VEHICLES

(75) Inventors: Harald Kemmann, Velbert; Jörg Simon, Heiligenhaus, both of (DE)

(73) Assignee: Huf Hulsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 09/297,461
(22) PCT Filed: Sep. 10, 1997
(86) PCT No.: PCT/EP97/04940
  § 371 Date: Jun. 28, 1999
  § 102(e) Date: Jun. 28, 1999
(87) PCT Pub. No.: WO98/19897
  PCT Pub. Date: May 14, 1998

(30) Foreign Application Priority Data

Nov. 5, 1996 (DE) .......................................... 196 454 611

(51) Int. Cl.$^7$ ....................................................... E05B 17/20
(52) U.S. Cl. ........................ 307/10.5; 307/10.3; 180/287; 200/43.08; 340/542
(58) Field of Search .................................. 307/10.6, 10.5, 307/10.3; 180/287; 70/276, 277; 340/542; 200/61.64, 43.08; 335/207, 205

(56) References Cited

U.S. PATENT DOCUMENTS

| 3,639,772 | * | 2/1972 | Wilson | 307/10.3 |
| 4,393,672 | * | 7/1983 | Gelhard | 70/277 |
| 4,803,467 | * | 2/1989 | Peters | 340/542 |
| 4,931,600 | * | 6/1990 | Braun | 200/43.08 |
| 5,202,580 |   | 4/1993 | Janssen . | |
| 5,578,977 | * | 11/1996 | Jansseune | 335/205 |

FOREIGN PATENT DOCUMENTS

| 195 47 304 A1 | 6/1996 | (DE) . |
| 0464278 | 1/1992 | (EP) . |
| 2026081 | 1/1980 | (GB) . |

* cited by examiner

*Primary Examiner*—Albert W. Paladini
(74) *Attorney, Agent, or Firm*—Friedrich Kueffner

(57) ABSTRACT

A device with a key-actuated closing cylinder and a switch triggers, when a key is turned therein, a particular electric function in a motor vehicle. In order to achieve a particularly compact and reliable device, at least two sensors are arranged inside the cylinder housing of the closing cylinder in zones that are mutually offset in the longitudinal direction. The sensor outputs are connected to a common evaluation device. The cylinder core has in corresponding axial zones several permanent magnets at particular points of its periphery. These points are selected so that the evaluation device detects different codes at the sensor outputs in the different working positions of the cylinder core and clearly identifies with these codes the corresponding working positions. The evaluation device thus acts as an electronic switch which on the basis of the sensed code triggers the electric function that corresponds to the momentary working position.

9 Claims, 7 Drawing Sheets

| Code-Tabelle | | | |
|---|---|---|---|
| Pos. | Drehstellung | Signal bei $H_1$ | Signal bei $H_2$ |
| 0. | FIG. 1a–1c | X | — |
|  | FIG. 2a+2b | — | — |
| 1. | FIG. 3a–3c | — | X |
| 2. | FIG. 4a–4c | X | X |
| 3. | FIG. 5a–5c | X | — |
FIG. 6
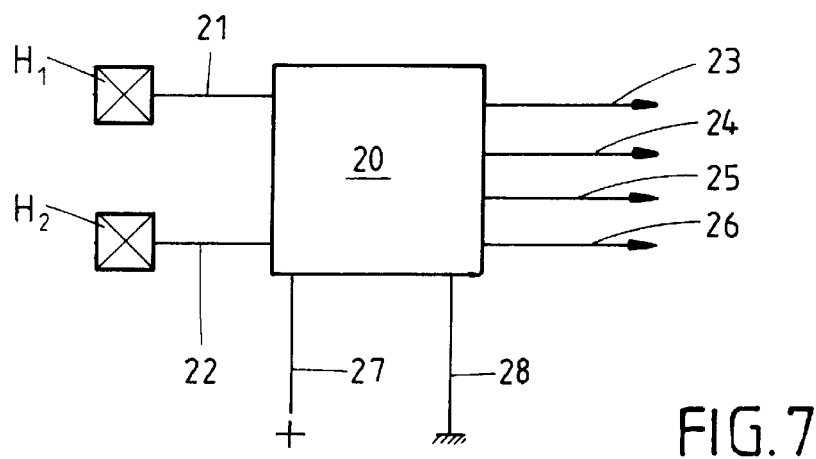
FIG. 7
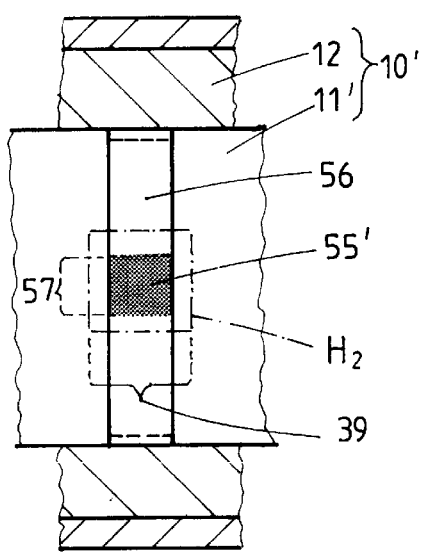
FIG. 8

DEVICE WITH A LOCK CYLINDER AND A SWITCHING DEVICE FOR VARIOUS ELECTRICAL FUNCTIONS, ESPECIALLY AN IGNITION STARTER SWITCH FOR MOTOR VEHICLES

BACKGROUND OF THE INVENTION

1. Field of the Invention

The invention pertains to a device with a key-actuatable lock cylinder and with a switching device, which, as a function of the rotation of the key, activates or deactivates certain electrical functions in a motor vehicle or the like, especially an ignition starter switch for a motor vehicle, where the lock cylinder consists of a stationary cylinder housing and a cylinder core, which is supported in the housing with freedom of rotation, which—starting from an original rotational position—is moved by the turning of the key into one of several defined working positions, in which the switching device initiates an electrical function in the motor vehicle or the like, which function is specific to the working position in question; where, in addition to tumblers for blocking the rotation of the cylinder core in the cylinder housing, a key channel to accept the key for unlocking the cylinder core is provided in the interior of the cylinder core; where permanent magnets are provided on the circumference of the cylinder core; and where, in addition to at least one locking channel for the tumblers, sensors responding to the permanent magnets of the cylinder core are also provided in the cylinder housing. The lock cylinder consists of a stationary cylinder housing and a cylinder core supported in the housing with freedom to rotate. The key can be inserted and removed from its key channel only in a certain original rotational position of the cylinder core. By turning the key, the cylinder core can be brought into certain defined rotational positions, which are to be referred in brief below as "working positions". In these working positions, certain electrical functions in the motor vehicle or in some other useful object are activated or deactivated by way of the switching device.

2. Description of the Related Art

When a device such as this is used in motor vehicles, it serves as a so-called "ignition starter switch". In the known device, the switching device has both a contact element which turns along with the turning of the key and stationary contacts, which are connected electrically to the given on-board electrical system. This device is located at the inner end of the lock cylinder. The movable switching element is connected in a torsionally rigid way to the cylinder core. In the working positions, the movable contact element becomes electrically connected to the stationary contact to which the system responsible for the desired function in the motor vehicle is connected. In the case of an ignition starter switch, there are usually three working positions besides the original rotational position. These include a first working position for switching on the electrical system of the vehicle, a second working position for releasing the internal combustion engine present in the vehicle for ignition, and a third working position for starting the engine.

The switching device in the known device occupies a considerable amount of space, and the space it occupies is then no longer available for other important components of the motor vehicle. In the known ignition starter switch, the switching device is installed at inner end of the lock cylinder. Thus the ignition starter switch is usually installed near the steering column of the motor vehicle, where it also has other duties to fulfill. These include the locking of the steering column after the key has been removed. Problems are encountered when the elements of the switching device are contacted mechanically. The angular distances between the working positions of the cylinder core initiating the various functions can be very small, for which reason the distances between the contacts in the switching device can be distinguished reliably only when a sufficient amount of space is available in the radial direction for the movement of the movable switching element from one angular position to the other. In addition, for safety reasons alone, a minimum amount of space must be provided for the switching device. All of this increases the space requirement.

There are locks (U.S. Pat. No. 5,186,031) in which a permanent magnet is installed on the circumference of the cylinder core. When the cylinder is turned by the key, an electronic monitoring function takes place by way of a sensor integrated into the cylinder housing; this sensor responds to the magnetic field of the cylinder core turning past it. As a result, the electrical system of the motor vehicle is turned on, and only then can the above-described switching device be activated. If the lock cylinder is forcibly torn out, electrical manipulations of the contacts are therefore useless. Unless the switching device is activated by way of the permanent magnet, which must be moved past the sensor, the switching device remains off-line. It therefore did not appear that there was any way to reduce the space requirement in the design of the known device.

In another device (U.S. Pat. No. 5,455,571), the attempt was made to make it more difficult for unauthorized persons to read the activation signal. This attempt took the form of a second sensor, which acts on the signal output of the addressed first sensor. The goal of this measure was to prevent outsiders from determining the signal value.

SUMMARY OF THE INVENTION

The invention is based on the task of developing a reliable device of the aforementioned kind which is simple and compact. This is accomplished in accordance with the invention by the following measures: the cylinder housing carries at least two sensors in zones which are axially offset from each other in the longitudinal direction, the sensor outputs of these sensors being connected to a common evaluator; in the corresponding axial zones, the cylinder core has several permanent magnets at the circumferential points which, in cooperation with the sensors, transmit to the sensor outputs an electrical coding which differentiates the original rotational position and the various working positions of the cylinder core; and the evaluator not only uniquely identifies the original rotational position and the working position of the cylinder core in question by way of the code but also—on the basis of the code which has been determined—initiates the electrical function in the motor vehicle or the like belonging to this working position.

The permanent magnets in the cylinder core cooperate with the sensors in the cylinder housing to encode all the defined working positions of the cylinder core. By way of the sensors, therefore, the specific working position of the cylinder core at the time in question can be uniquely identified, and this information can be sent to an evaluator, which then simultaneously acts as an electronic switch and initiates the individual electrical functions in the motor vehicle or other useful object. Whereas, in the state of the art, the rotational position is detected on the basis of an element of the switching device which moves along with the cylinder core, it is, in the invention, the job of the stationary sensors in the cylinder housing to identify the rotational positions. The code-controlled evaluator for the code-specific electrical functions is connected to the read-out points in the cylinder housing by signal lines of small diameter and can thus be installed at a point any desired distance away.

Because the components which bring about the desired electrical function are now electronic and no longer mechanical, it is also possible to produce the switching device in the device according to the invention in an extremely compact and inexpensive manner. The device according to the invention requires only that holes be provided in the cylinder housing to accept the sensors which read the code. The permanent magnets in the cylinder core can also be countersunk in holes at the points on the circumference which determine the coding. This means that, in the device according to the invention, the lock cylinder does not need to occupy any more space than it does in the state of the art, but also that the space at the inner end of the lock cylinder, where previously the switching device was located, can now be used for something else.

BRIEF DESCRIPTION OF THE DRAWING

Additional measures and advantages of the invention can be derived from the subclaims, from the following description, and from the drawings. The invention is illustrated in the drawings on the basis of an exemplary embodiment:

FIGS. 3c, 4c, and 5c show cross sections through the lock cylinder corresponding to FIG. 1b after the cylinder core has been moved into the three additional rotational positions according to FIGS. 3a, 4a, and 5a;

FIGS. 3c, 4c, and 5c show additional cross sections through the lock cylinder in analogy to FIG. 1c after the key has rotated the core into the positions of FIGS. 3a, 4a, and 5a;

FIG. 6 shows a code table of the signals being received in the various rotational positions of FIGS. 1a–5c;

FIG. 7 shows a schematic circuit diagram of an evaluator for the signals being received in the original rotational position of FIGS. 2a and 2b and for the working positions of FIGS. 3a–5c; and FIG. 8 shows part of a second embodiment of the lock cylinder according to the invention.

DESCRIPTION OF THE PREFERRED EMBODIMENT

The device according to the invention comprises a lock cylinder 10 according to FIGS. 1a to 5c and also an electronic evaluator 20, the basic design of which is illustrated in FIG. 7. Lock cylinder 10 itself, however, includes not only mechanical but also electrical components.

Figure 1A:
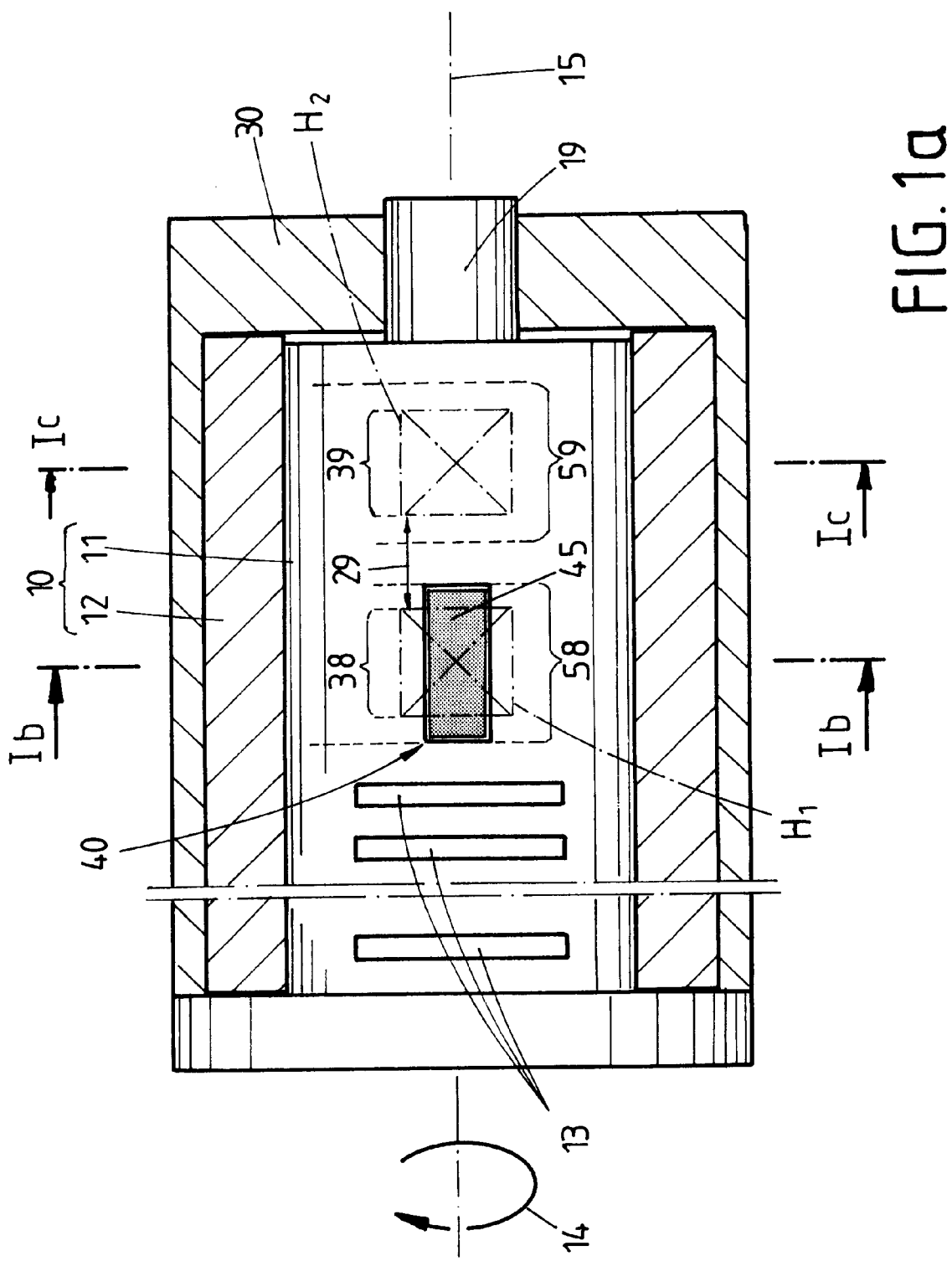
FIG. 1a shows a partial, longitudinal cross section through the lock cylinder of the device according to the invention in the original rotational position of the cylinder core, before the key has been inserted.

The lock cylinder consists of a cylinder core 11 and a cylinder housing 12. Whereas cylinder housing 12 is mounted permanently in a chassis 30 of a motor vehicle, cylinder core 11 is supported so that it can rotate in housing 12. The cylinder core has interior chambers for conventional, spring-loaded tumblers 13, only one of which is indicated in FIG. 1a. Cylinder housing 12 has locking channels in the usual manner (not shown), in which tumblers 13 are normally engaged to prevent the rotation of cylinder core 11 in the direction of arrow 14 of FIG. 1a around cylinder axis 15 indicated in dash-dot line. Cylinder core 11 also has a key channel 16, visible in FIGS. 1b and 1c, which, as can be seen in FIGS. 2a and 2b, serves to accept a key 17 as needed, and finally a radial chamber 18, in which a slider 31 is installed, which is acted on by the force 32 of a spring 33.

Figure 1B:
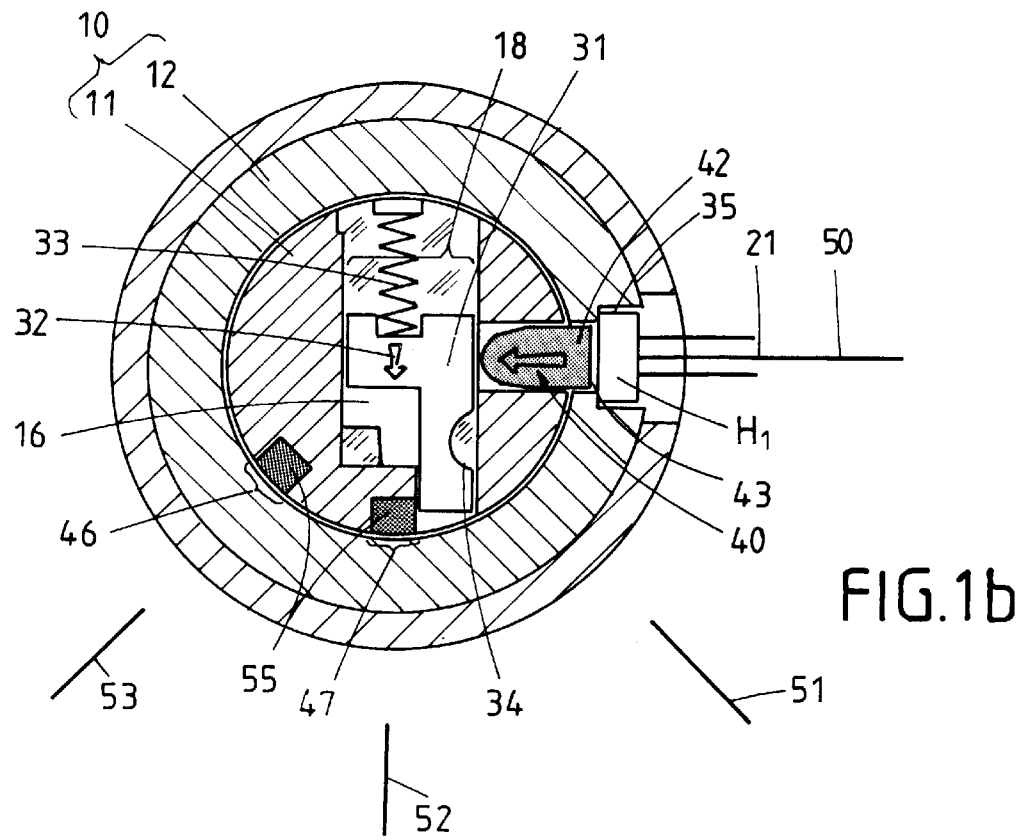
FIGS. 1b and 1c show cross sections through the lock cylinder according to FIG. 1a along lines Ib—Ib and Ic—Ic.
Figure 1C:
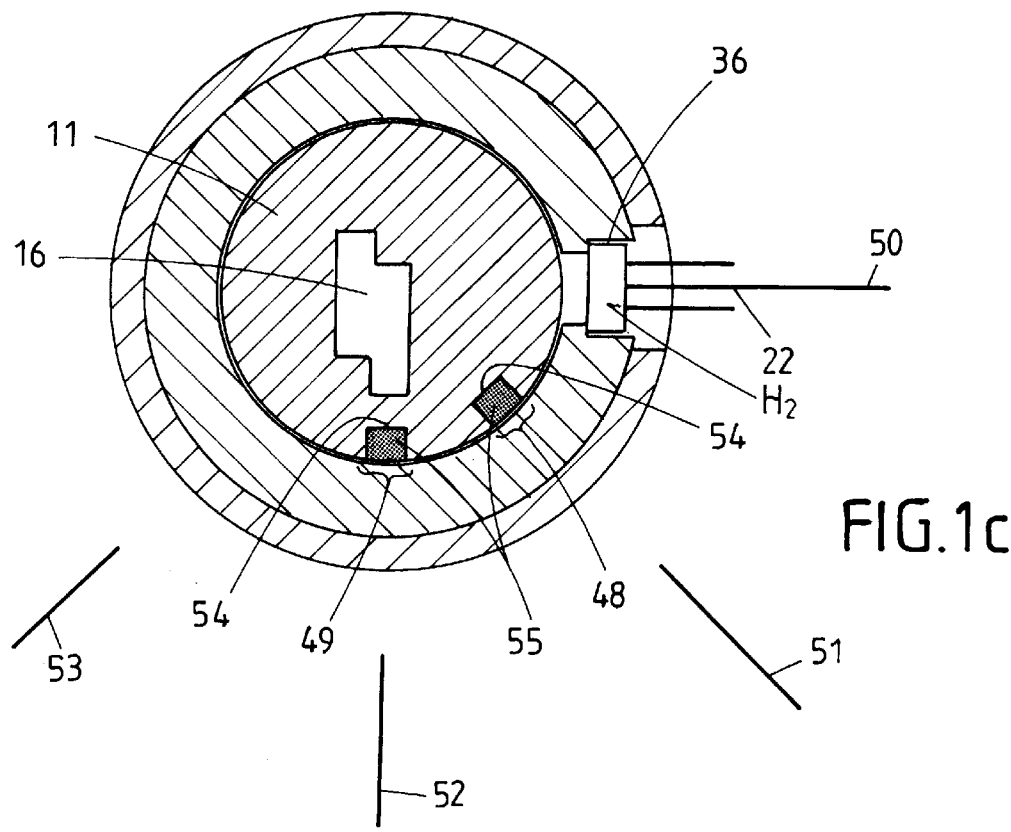
Figure 2A:
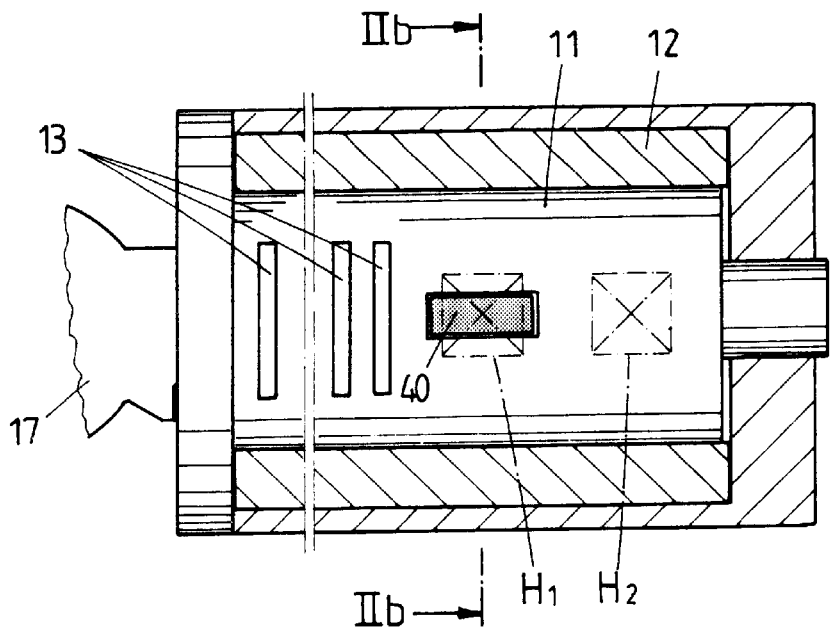
FIG. 2a shows a longitudinal cross section of the lock cylinder corresponding to FIG. 1a, again in the original rotational position, but this time with the key inserted.

FIGS. 1a–1c show the original rotational position of cylinder core 11. This rotational position is illustrated by auxiliary line 50 in FIG. 1b. In this case, a locking bar 40 has moved radially outward, and its outer working end 42 is engaged in a housing groove 43; it acts like a tumbler and blocks the rotation of cylinder core 11 as shown in FIG. 1b. Locking bar 40 is in its "locking position" in FIGS. 1a–1c. When a properly-fitting key 17 is inserted into key channel 16 as shown in FIGS. 2a and 2b, control surfaces 37 provided on the profile of the key sort out the above-mentioned tumblers 13 along the cross section of cylinder core 11, which has the effect of releasing cylinder core 11; in addition, however, slider 31 is also pushed back against spring force 32 acting on it into the position which can be seen in FIG. 2b, where a recess 34 provided in slider 31 comes into alignment with the control end 41 of locking bar 40.

Figure 2B:
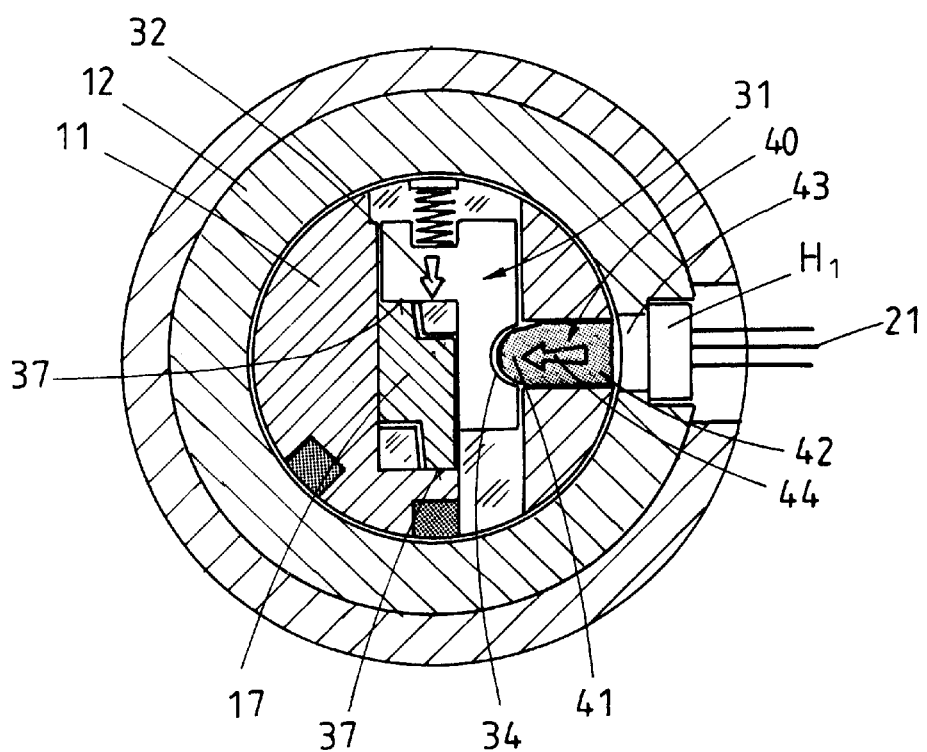
FIG. 2b shows the cross section already presented in FIG. 1b in the original rotational position but after the key has been inserted.

FIG. 2b shows the same original rotational position 50 of cylinder core 11 as FIG. 1b does, as can be seen from the rotational position of locking bar 40. Locking bar 40 is also spring-loaded in the direction of arrow 44. The spring responsible for this is not shown in detail in the figures. While the previously mentioned radial alignment is present, therefore, control end 41 of locking bar 40 can travel into recess 34. Then working end 42 of the locking bar is disengaged from housing groove 43. When key 17 is inserted, therefore, the blockade caused up until now by locking bar 40 is eliminated; the locking bar is now in its "release position", and cylinder core 11 can be rotated by the key in the direction of arrow 14. Depending on the extent of this rotation 14, cylinder core 11 arrives in one of three defined rotational positions 51, 52, 53, which trigger certain electrical functions in the device according to the invention and therefore, as already said above, should be referred to as "working positions". For reasons of clarity, these working positions are arranged not only at the same distances but also at exaggeratedly large angular distances from each other, as illustrated by auxiliary lines 51, 52, 53. The location of these auxiliary lines is derived from the specific rotational position of the locking bar at the time.

The present exemplary embodiment is based on the so-called ignition starter switch of a motor vehicle. Only when its cylinder core 11 is in the original rotational position 50 of FIGS. 1a–1c is it possible for key 17 to be inserted into key channel 16, as illustrated in FIGS. 2a and 2b, or for it to be pulled back out again. That is, it is only in this original rotational position 50 that tumblers 13 are aligned radially with the above-mentioned locking channels in housing 12 and allow themselves to be moved in the radial direction. In original rotational position 50, the electrical system of the motor vehicle remains "off" until a properly fitting key is inserted. In the present invention, as long as a properly fitting key 17 has not been fully inserted into cylinder core 11, that is, in the situation according to FIGS. 1–1c, evaluator 20 also remains off-line. The evaluator is dead and unable to accomplish any electrical control functions whatever, even if an attempt is made to manipulate the power supply. By insertion of key 17 according to FIGS. 2a and 2b, however, the evaluator is "activated" according to the invention and can be used for the other functions. This is accomplished in the present invention by means of a special design of locking bar 40.

That is, in the device according to the invention, locking bar 40 consists of magnetic material 45, which makes locking bar 40 into a radially movable "permanent magnet". The use of magnetic material 45 in locking bar 40 is indicated by light dotted shading in the drawings. A first sensor H1, which is mounted in a suitable socket 35 in cylinder housing 12, is assigned to this permanent magnet 40. Sensor H1 is a Hall-effect device, which is located in the zone of cylinder housing 12 indicated by the number 38 in FIG. 1a. Another socket 36 for an additional sensor H2 in cylinder housing 12 is provided a certain axial distance 29 away; this sensor is also a Hall-effect device. The positions of these two sensors H1, H2 are drawn in FIG. 1a in dash-dot lines, from which their locations in the two housing zones 38, 39 can be derived. In original rotational position 50, no magnet is present at sensor H2, as can be derived from FIG. 1c. The two sensors H1, H2 with their outputs 21, 22 are connected to the same evaluator 20 according to FIG. 7. When locking bar 40 is in its radially outward position shown in FIG. 1b, the evaluator detects its magnetic field over sensor output line 21 from H1 but does not detect any signal on output line 22 from H2. This situation is recognized by evaluator 20 as a defined code, which in this case keeps the on-board electronic system off-line. This situation, a "yes/no" code, appears in the top line of the code table shown in FIG. 6.

When key 17 is inserted according to FIGS. 2a and 2b, locking bar 40 now arrives in its previously described release position, in which the distance between it and Hall generator H1 is greater. As a result, the magnetic field detected by sensor H1 is significantly decreased, and this is interpreted by the evaluator as "zero signal". Evaluator 20 does not detect any signal from sensor H2 either. This situation is indicated in the second line of the code table of FIG. 6. The transition of the original code "yes/no" according to FIGS. 1a–1c to the code "no/no" of FIGS. 2a, 2b allows evaluator 20 to conclude that a properly fitting key has been inserted. Evaluator 20 now transmits an appropriate signal along a data line to activate the corresponding systems in the motor vehicle, such as an on-board computer, which directs appropriate control units such as an anti-theft device. Although this is shown in FIG. 7 by a first output line 23, this could also be accomplished by way of a common bus line replacing all of output lines 23–26. The bus line would then transmit the digital data generated by the evaluator on the basis of the code to a central electrical unit in the motor vehicle. Evaluator 20, according to FIG. 7, is provided with a power supply 27 and is grounded by a line 28.

As indicated by the cross sections of FIGS. 1b and 1c, additional permanent magnets 55 are provided in corresponding axial zones 58, 59 of cylinder core 11; these magnets cannot move in the radial direction as locking bar 40 can; instead, they are mounted immovably in suitable recesses 54 in the circumferential surface. Permanent magnets 55 can thus be flush with the circumference of cylinder core 11. These permanent magnets 55 are indicated in the drawings by dotted shading. In the given design of lock cylinder 10, permanent magnets 55 have a somewhat stronger magnetic field strength than magnetic material 45 of which locking bar 40 is made. This is indicated in the drawings by the different degrees of shading. In the present case, two of these stationary permanent magnets 55 are provided in each of the two axial zones 58, 59, namely, at defined points 46, 47, 48, 49 on the circumference of the cylinder core 11, to be described in greater detail below. These locations are selected in correspondence with the angles of rotation between the original rotational position 50 and the three additional working positions 51, 52, 53, as can be derived from a consideration of the additional FIGS. 3a–5c.

Figure 3A:
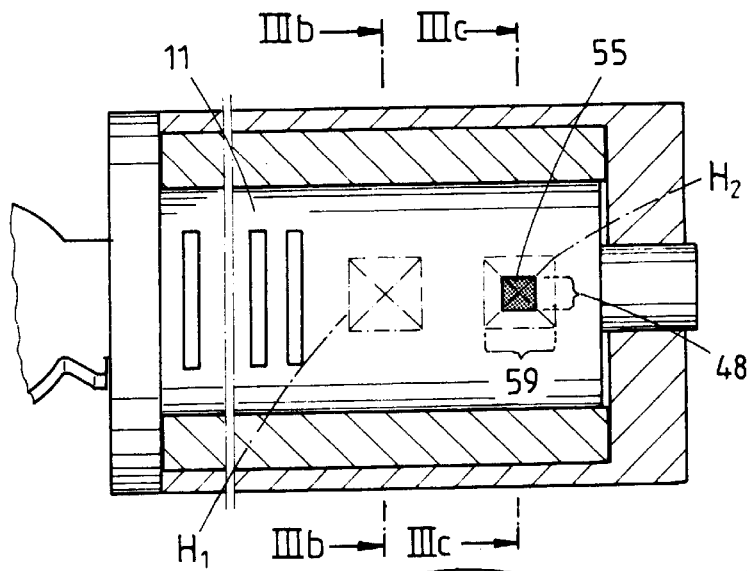
FIGS. 3a, 4a, and 5a show longitudinal cross sections similar to FIG. 1a after the cylinder core has been moved by the inserted key into the three additional rotational positions, which correspond to the "ON" position of the vehicle's electrical system, to the ignition position of the engine, and to the starting position of the engine.
Figure 3B:
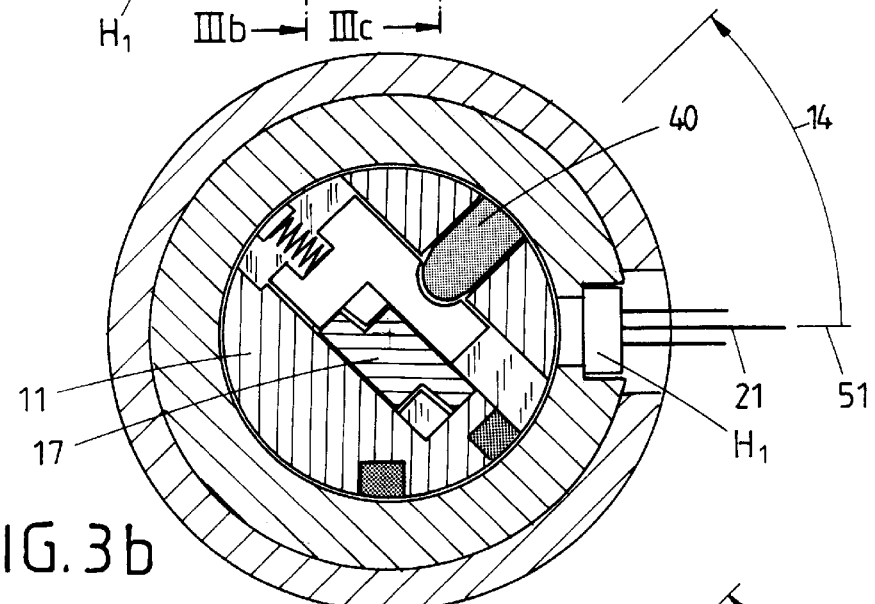
Figure 3C:
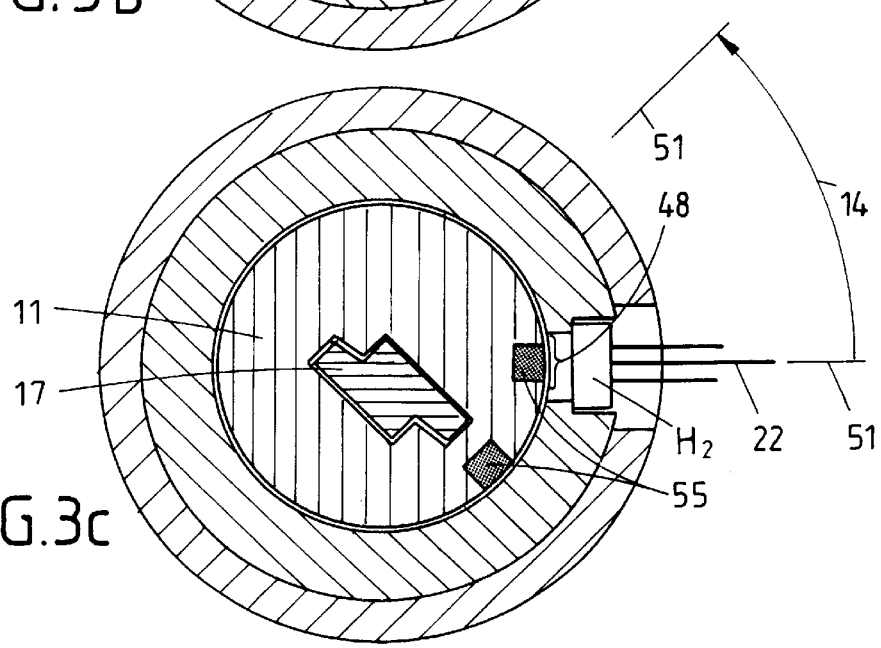

In FIGS. 3a–3c, the turning 14 of the key has moved cylinder core 11 to first working position 51. If the device has been incorporated into an ignition starter switch, the electrical system of the vehicle is turned on in this position. This working position 51 is also called the "radio position". In the case of an ignition starter switch, we speak of power being supplied to "terminal R" of the associated switching device in this working position 51. Working position 51 of cylinder core 11 is held by latching elements (not shown in detail) and can be felt as the key is being turned 14. In this rotational position, locking bar 40 is even farther away from sensor H1, for which reason this sensor, as can be derived from the third line of the code table of FIG. 6, transmits no signal to evaluator 20. In the adjacent axial zone 59 of cylinder core 11, however, a permanent magnet 55 has become radially aligned with sensor H2. This permanent magnet 55 is located at a circumferential point 48 of this zone 59 which, upon rotation into working position 51, is near sensor H2. By way of sensor output 22, evaluator 20 receives a signal, as can be seen from the third line of the code table of FIG. 6. Upon receiving this code "no/yes", evaluator 20 uniquely determines that cylinder core 11 is in this first working position 51. Because the evaluator acts like an electronic switch, it issues the corresponding control commands to the appropriate systems or to the on-board computer controlling these systems. This is shown in FIG. 7 in that now a control signal is transmitted over second output line 24. In technical language, it is said that "terminal R" has been activated.

Figure 4A:
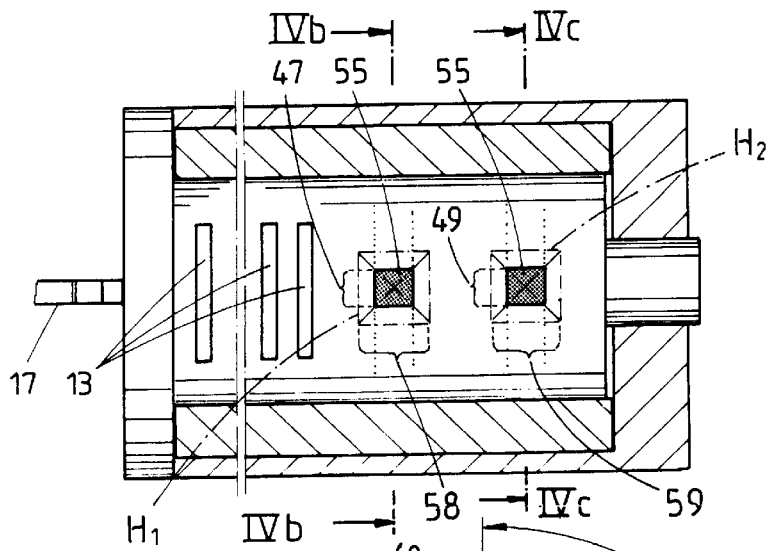
Figure 4B:
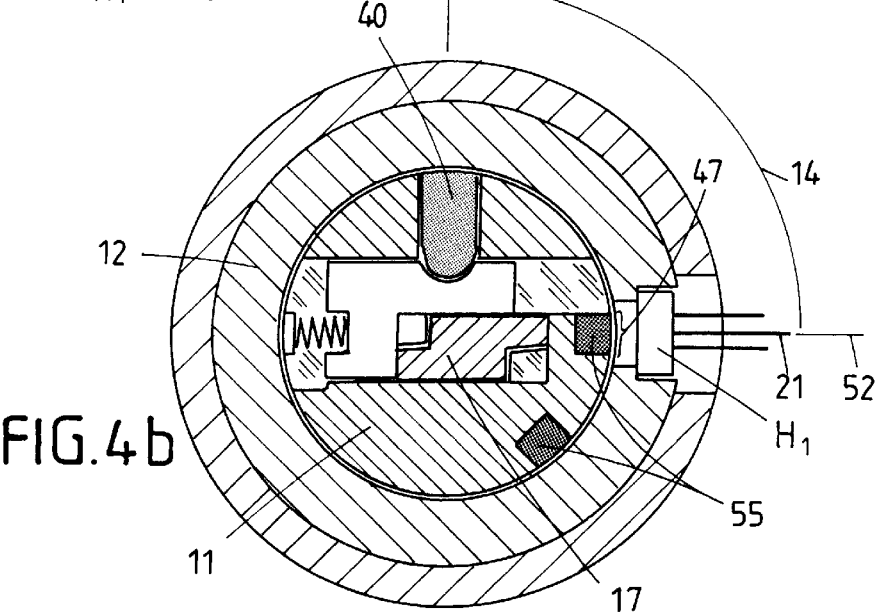
Figure 4C:
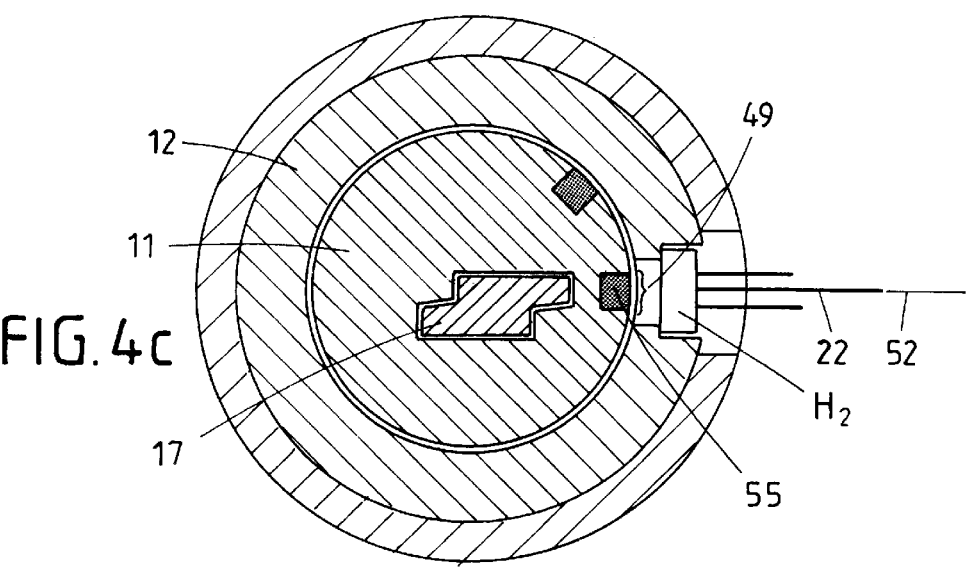

In FIGS. 4a–4c, cylinder core 11 has been turned even farther in the direction of arrow 14 so that it has now arrived at second working position 52. Additional permanent magnets 55 are located in the two axial zones 58, 59 of the cylinder core at the circumferential points identified as 47 and 49, which are then oriented toward the two sensors H1, H2 in cylinder housing 12. This working position 52 is also identified by latching elements, the effects of which are perceptible during rotation 14 of key 17. Evaluator 20 in this case detects a signal at both sensor outputs 21, 22, as indicated in the fourth line of the code table of FIG. 6. When it receives this code "yes/yes", evaluator 20 identifies the working position of cylinder core 11 as the second working position and transmits a corresponding control signal to the systems of the motor vehicle which are now to be put into action. In the case of an ignition starter switch, this second working position is usually responsible for releasing the engine for ignition. This is symbolized in the diagram of FIG. 7 by a third output line 25, which is now active. In the case of an ignition starter switch, it is traditional to speak in this working position of supplying "terminal 15" of the switching device with electrical current.

Figure 5A:
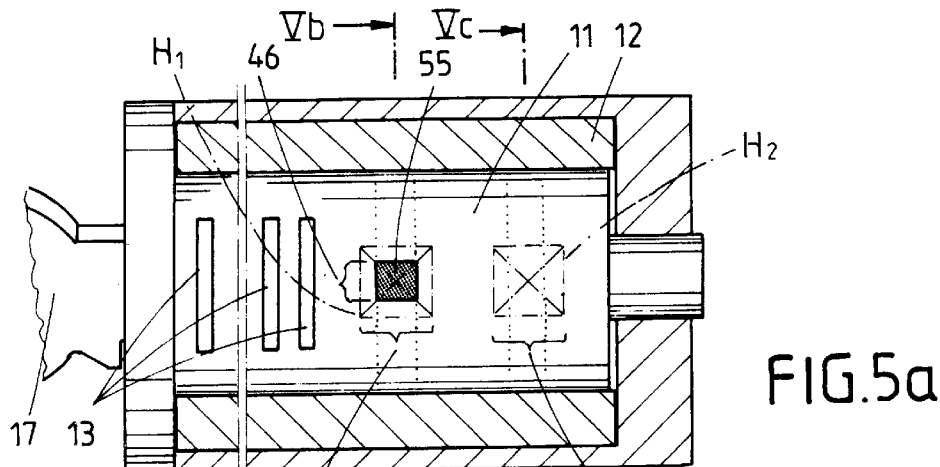
Figure 5B:
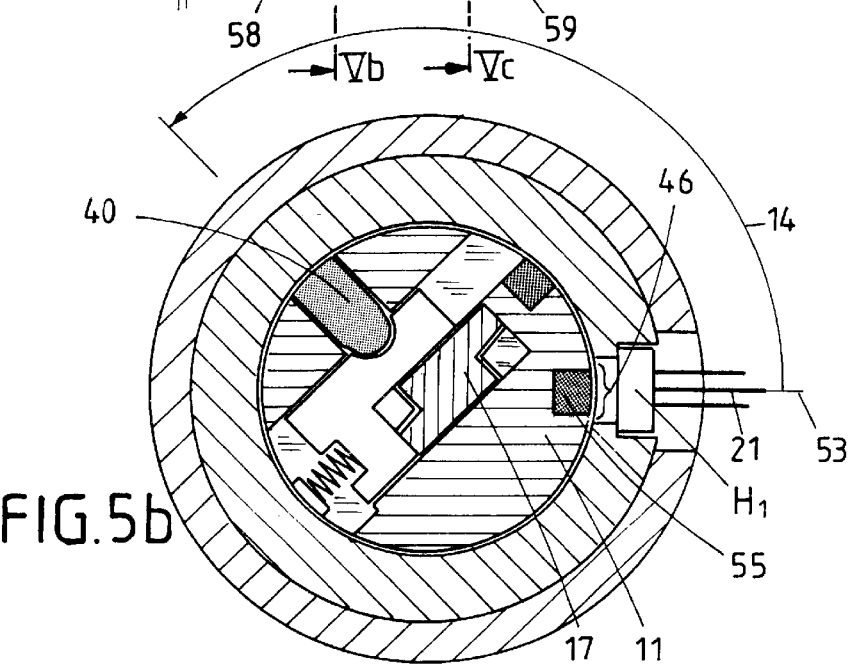
Figure 5C:
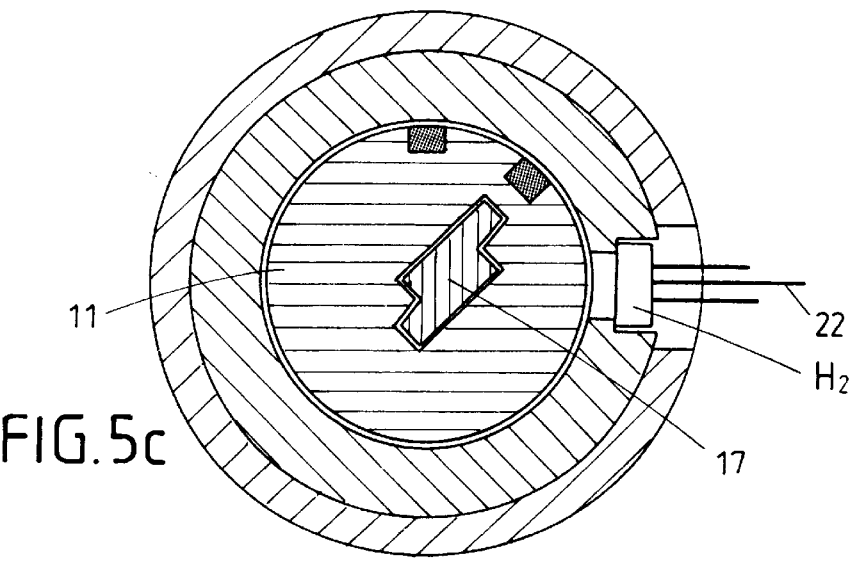

In FIGS. 5a–5c, cylinder core 11 has been turned in the direction of arrow 14 so far that it has now reached a third defined working position 53. This third working position 53 can be determined by a rotational end-stop acting on the cylinder core 11. In this case, a permanent magnet 55 is located only on circumferential point 46 in axial zone 58 of cylinder core 11 belonging to sensor H1, whereas, in the other axial zone 59, an empty circumferential point of cylinder core 11 appears. As a result, only the first sensor H1 detects a signal, which arrives via sensor output 21 at evaluator 20. Sensor H2 does not transmit any signal. Evaluator 20 thus establishes in this case the code "yes/no" according to the last line of the code table of FIG. 6.

A code such as this has already been obtained in the first line of FIG. 6, which has been described on the basis of FIGS. 1a–1c. There, however, cylinder core 11 was still in the original rotational position, in which evaluator 20 was still off-line. There, key 17 had still not been inserted, and cylinder core 11 was blocked by locking bar 40. In the case of FIGS. 5a–5c, however, evaluator 20 is now active and therefore identifies this code "yes/no" clearly as the third working position of cylinder core 11. When the device is applied to an ignition starter switch, this position usually corresponds to the electrical "start the engine" function of the associated switching device, in which the internal combustion engine in the motor vehicle is started. It is said in this case that "terminal 50" has been activated. In the present invention, evaluator 20 activates a fourth output line 26 in the diagram of FIG. 7.

In this case, evaluator 20, acting as an electronic switching device, activates the starter of the motor vehicle. Normally, cylinder core 11 of an ignition starter switch is under the action of a rotational pulse spring, which, after the release of key 17, tries to push cylinder core 11 back into the second working position of FIGS. 4a–4c. This latter situation, too, is recognized by evaluator 20 on the basis of the resulting change in the code to "yes/yes" in FIG. 6.

FIG. 8 shows an alternative design of a lock cylinder according to the invention 10', only a small part of which is illustrated. The difference from the previously described first exemplary embodiment consists in that, in each axial zone 38 where a sensor H2 is seated in the cylinder housing, a ring or a ring segment 56 of magnetizable material is provided in cylinder core 11'. This material is subjected to polarizing magnetization at the circumferential points of cylinder core 11' where permanent magnets 55' detectable as a code are wanted, as shown in FIG. 8. Then sensor H2 detects the magnetic field at defined sections 57 of the ring, and evaluator 20 again determines from that signal the working positions in question on the basis of the code. Ring section 57 acting as permanent magnet 55' in FIG. 8 is illustrated by dotted shading. FIG. 8 shows the radial alignment of this ring section 57, made relevant by magnetization, with sensor H2. This corresponds to the first working position of cylinder core 11' shown in FIGS. 3a–3c.

The design of lock cylinder 10' according to FIG. 8 makes it possible, first, to prefabricate all the cylinder cores, regardless of the desired code. Permanent magnets 55' corresponding to the individual encoding of the rotational positions of cylinder core 11' are then provided by subjecting the appropriate sections 57 of the ring to magnetization 55'. It would also be possible to magnetize the defined sections 57 of the rings or ring segments 56 before their installation in cylinder core 11'.

It is obvious that a different number of sensors H1, H2 and a different arrangement of them could also be used, if appropriate for a specific application. This also applies to the number and position of the permanent magnets. If needed, it would also be possible to omit the use of a locking bar 40 which can be moved radially by key 17 or to not make this locking bar 40 out of magnetic material 45. Because of its magnetic material 45, locking bar 40 in the present invention signal to evaluator 20 whether or not the correct key has been inserted in cylinder core 11. This is used to activate and deactivate evaluator 20, the on-board computer, or the central electrical system. The magnetic field strength of the individual permanent magnets 55 or of permanent magnets 55' arising at certain points by magnetization could have magnetic field strengths which are different from each other or a different magnetic field orientation, which could be detected by sensors H1, H2 and then evaluated. By means of these measures, the number of possible code variants would be significantly increased. One could then provide enough information merely in axial zone 38 and/or 39 by the use of different magnets 55 or magnetizations 55' in terms of the orientation and/or strength of the magnetic fields to make it possible for a single sensor H1 or H2 to determine the individual working position 51, 52, 53 in question of cylinder core 11 or 11'. In this case, the only factors which vary are the number of sensors and the differences between the permanent magnets at the specific circumferential points of cylinder core 11 or 11'.

In the device according to the invention, no components for a switching device to be controlled by lock cylinder 10 are required at inner end 19 of the lock cylinder shown in FIG. 1a. This space is therefore now available for the installation of other important components of the motor vehicle.

LIST OF REFERENCE NUMBERS

H1 first sensor, Hall-effect device
H2 second sensor, Hall-effect device
10, 10' lock cylinder
11, 11' cylinder core of 10, 10'
12 cylinder housing of 10
13 tumbler in 11
14 rotation arrow of 11
15 cylinder axis of 10
16 key channel in 11
17 key
18 radial chamber for 31
19 inner end of 10
20 evaluator
21 sensor output of H1
22 sensor output of H2
23 first output line of 20
24 second output line of 20
25 third output line of 20
26 fourth output line of 20
27 electric power line of 20
28 ground lead of 20
29 longitudinal offset between H1, H2, in 12
30 chassis for 10
31 slider
32 arrows of the force acting on 31
33 spring for 32
34 recess in 31 for 41
35 socket in 12 for H1
36 socket in 12 for H2
37 control surface on 17 for 13, 31
38 axial zone in 12 for H1
39 axial zone in 12 for H2
40 locking bar
41 control end of 40
42 working end of 40
43 housing groove of 42
44 force arrow for the spring-loading of 40
45 magnetic material of 40

46 first circumferential point in 11 at 58
47 second circumferential point in 11 at 58
48 first circumferential point in 59 of 11
49 second circumferential point in 59 of 11
50 original rotational position of 11
51 first working position of 11 (radio)
52 second working position of 11 (ignition)
53 third working position of 11 (starting)
54 recess for 55 in 11
55, 55' permanent magnet in 11, 11'
56 ring, ring segment
57 magnetizable ring section of 56
58 first axial zone of 11 for 40, 55
59 second axial zone in 11 for 55

What is claimed is:

1. Device with a key-actuatable lock cylinder (10) and with a switching device,
   which, as a function of the rotation (14) of the key, activates or deactivates certain electrical functions in a motor vehicle or the like,
   especially an ignition starter switch for a motor vehicle,
   where the lock cylinder (10) consists of a stationary cylinder housing (12) and a cylinder core (11), which is supported in the housing with freedom of rotation,
   which—starting from an original rotational position (50)—is moved by the turning (14) of the key into one of several defined working positions (51, 52, 53), in which the switching device initiates an electrical function in the motor vehicle or the like, which function is specific to the working position in question;
   where, in addition to tumblers (13) for blocking the rotation of the cylinder core (11) in the cylinder housing (12), a key channel (16) to accept the key (17) for unlocking the cylinder core (11) is provided in the interior of the cylinder core (11);
   where permanent magnets (55) are provided on the circumference of the cylinder core (11); and
   where, in addition to at least one locking channel for the tumblers (13), sensors responding to the permanent magnets (55) of the cylinder core are also provided in the cylinder housing (12),
   wherein
      the cylinder housing (12) carries at least two sensors (H1, H2) in zones (58, 59) which are axially offset from each other in the longitudinal direction (29), the sensor outputs (21, 22) of these sensors being connected to a common evaluator (20); in that,
      in the corresponding axial zones (58, 59), the cylinder core (11) has several permanent magnets (40, 55) at the circumferential points (46, 47, 48, 49) which, in cooperation with the sensors (H1, H2), transmit to the sensor outputs (21, 22) an electrical coding which differentiates the original rotational position (50) and the various working positions (51, 52, 53) of the cylinder core (11); and in that
         the evaluator (20) not only uniquely identifies the original rotational position (50) and the working position (51, 52, 53) of the cylinder core (11) in question by way of the code but also—on the basis of the code which has been determined—initiates the electrical function in the motor vehicle or the like belonging to this working position (51, 52, 53).

2. Device according to claim 1, wherein the axes of the sensors (H1, H2) in the cylinder housing (12) are essentially aligned with each other.

3. Device according to claim 1 wherein, in each of the axial zones (58, 59) aligned with one of the sensors (H1, H2), the cylinder core (11) has at least two permanent magnets (55) and—by comparison of the arrangement pattern of the magnets in the individual axial zones (58, 59)—at least one of the permanent magnets (55) is seated at a rotationally offset circumferential point (46, 47, 48, 49) characterizing a different working position (51, 52, 53) of the cylinder core (11).

4. Device according to claim 1 with a radially movable locking bar (40) in the cylinder core (11), which, after the key (17) has been removed, is held in a locking position projecting radially beyond the circumference of the cylinder, where it engages in a groove (43) provided in the cylinder housing (12) and thus prevents rotation (14),
   it moves to a lowered, release position, in which it is disengaged from the housing groove (43) and allows the key (17) to rotate (14) the cylinder, when a properly fitting key (17) has been inserted,
   wherein
      the locking bar (40) is magnetizable or is itself a permanent magnet (45), to which a bar sensor (H1) responding to its magnetic field is assigned; in that
      the bar sensor (H1) is seated at the inner position of the cylinder housing which is aligned essentially in the radial direction with the locking bar (40) when the cylinder core (11) is in its original rotational position (50), i.e., the position in which it is possible to insert the key (17) in its key channel (16) and to remove it again; in that
         the bar sensor (H1) responds to the change in the magnetic field which occurs when a properly fitting key (17) is inserted, this magnetic field being the result of the dropping of the locking bar (40) out of its locking position into its release position; and in that
         the evaluator (20) responds to this signal by determining that the cylinder core is in its original rotational position (50) and that a properly fitting key (17) has been inserted.

5. Device according to claim 4, wherein while the cylinder core is in the original rotational position (50) without a key inserted, the evaluator (20) remains in its inactive rest position, but that the evaluator (20) is activated by the signal initiated by the change in the magnetic field which occurs when the locking bar (40) drops.

6. Device according to claim 5, wherein the activation of the evaluator (20) occurs only when the detected magnetic field change is within certain limiting values.

7. Device according to claim 4, wherein, upon rotation (14) of the cylinder core (11), the bar sensor (H1) also responds to one or more radially immovable permanent magnets (55),
   which are arranged in the same axial zone (58) as the radially movable locking bar (40).

8. Device according to claim 1, wherein the cylinder core (11') has a ring or a ring segment (56) of magnetizable material in each axial zone which is aligned with one of the sensors (H2); and in that
   the permanent magnet (55') is produced in a defined section (57) of the ring at the desired point on the circumference of the cylinder core (11') by polarizing magnetization of the material of the ring or ring segment (56).

9. Device according to claim 1, wherein the sensors (H1, H2) respond to different magnetic field strengths and/or magnetic field orientations of the various permanent magnets (55, 55') arranged at various points on the circumference, these differences being registered as different codes.

* * * * *

UNITED STATES PATENT AND TRADEMARK OFFICE
CERTIFICATE OF CORRECTION

PATENT NO. : 6,236,121 B1
DATED : May 22, 2001
INVENTOR(S) : Harald Kemmann et al.

It is certified that error appears in the above-identified patent and that said Letters Patent is hereby corrected as shown below:

<u>Title page,</u>
Item [73], Huf <u>Hülsbeck</u> & Fürst GmbH & Co. KG, Velbert (DE)

Signed and Sealed this

Twenty-sixth Day of February, 2002

Attest:

Attesting Officer

JAMES E. ROGAN
*Director of the United States Patent and Trademark Office*